US008693464B2

(12) United States Patent
Ku et al.

(10) Patent No.: US 8,693,464 B2
(45) Date of Patent: Apr. 8, 2014

(54) METHOD AND APPARATUS FOR PROCESSING CALLS

(75) Inventors: Bernard Ku, Austin, TX (US);
Lakshminarashimhan Naidu, Pearland, TX (US); Mehrad Yasrebi, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 179 days.

(21) Appl. No.: 13/234,016

(22) Filed: Sep. 15, 2011

(65) Prior Publication Data

US 2013/0070667 A1 Mar. 21, 2013

(51) Int. Cl.
*H04L 12/56* (2011.01)
*H04L 12/26* (2006.01)

(52) U.S. Cl.
CPC .................................. *H04L 12/2636* (2013.01)
USPC ........................................................ 370/352

(58) Field of Classification Search
CPC ............ H04L 12/2605; H04L 12/2636; H04L 12/2801; H04L 12/2852; H04L 12/2854; H04L 12/2856
USPC ................. 370/352–356, 431, 432, 464, 465; 709/227, 238–244
See application file for complete search history.

(56) References Cited

U.S. PATENT DOCUMENTS

| 6,741,585 | B1 * | 5/2004 | Munoz et al. ................. 370/352 |
| 6,816,481 | B1 * | 11/2004 | Adams et al. ................. 370/352 |
| 7,606,202 | B2 * | 10/2009 | Marathe et al. ............... 370/331 |
| 7,787,445 | B2 * | 8/2010 | Marsico ........................ 370/352 |
| 8,325,905 | B2 * | 12/2012 | Gregorat et al. ......... 379/220.01 |
| 8,400,947 | B2 * | 3/2013 | Heinze et al. ................. 370/259 |
| 2003/0081754 | A1 | 5/2003 | Esparza |
| 2007/0071221 | A1 * | 3/2007 | Allen et al. ............. 379/265.01 |
| 2008/0019356 | A1 | 1/2008 | Marsico |
| 2008/0025492 | A1 | 1/2008 | Heinze |
| 2008/0285543 | A1 | 11/2008 | Qiu |
| 2009/0191871 | A1 | 7/2009 | Siegel |
| 2010/0158201 | A1 | 6/2010 | Marathe |
| 2013/0070737 | A1 * | 3/2013 | Ku et al. ....................... 370/338 |

* cited by examiner

*Primary Examiner* — Dmitry H Levitan
(74) *Attorney, Agent, or Firm* — Guntin & Gust, PLC; Andrew Gust

(57) ABSTRACT

A system that incorporates teachings of the present disclosure may include, for example, receiving a request for a voice call at an interrogating call session control function server of an internet protocol multimedia subsystem where the call is associated with an originating communication device, transmitting a mapping query from the interrogating call session control function server to a database to obtain an internet protocol address for establishing the call with a recipient communication device in response to the request for the call, and routing the request to a server of the internet protocol multimedia subsystem or a second server based on a response to the mapping query provided by the database. Other embodiments are disclosed.

19 Claims, 4 Drawing Sheets

100

METHOD AND APPARATUS FOR PROCESSING CALLS

CROSS-REFERENCE TO RELATED APPLICATIONS

This application is related to co-pending U.S. application Ser. No. 13/234,036 entitled "METHOD AND APPARATUS FOR MANAGING CALLS" filed on Sep. 15, 2011 by Ku et al., the disclosure of which is hereby incorporated by reference herein in its entirety.

FIELD OF THE DISCLOSURE

The present disclosure relates generally to processing calls in a communication system.

BACKGROUND

End user devices can operate in numerous different systems that employ distinct communication protocols. It can be desirable to provide compatibility of these distinct systems and protocols. However, as existing systems and protocols evolve and as new systems and protocols are introduced, the complexity of establishing system and protocol compatibility grows.

DETAILED DESCRIPTION

Figure 1:
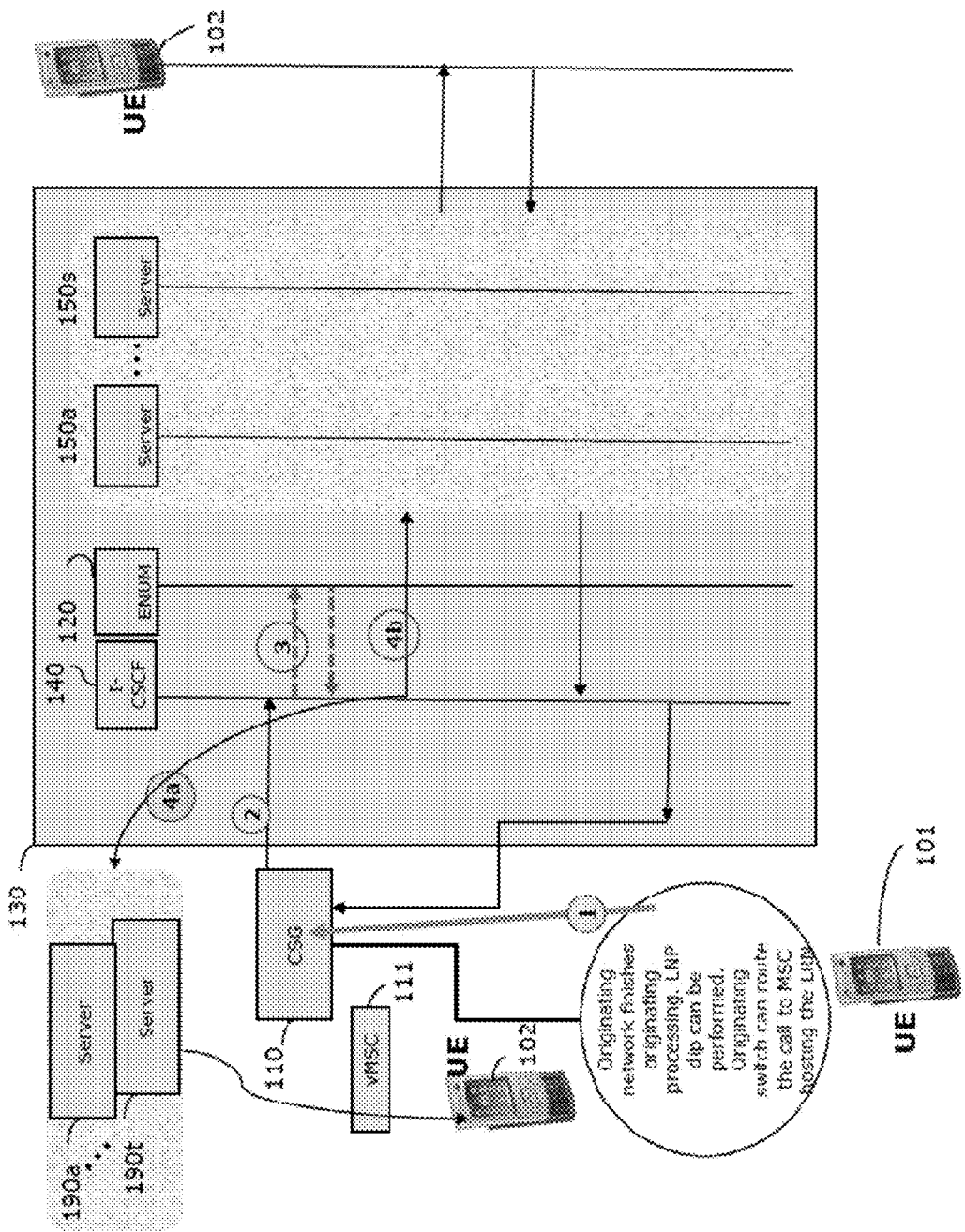
FIG. 1 depicts an illustrative embodiment of a call flow diagram of a communication system.

One or more of the example embodiments described herein allow for completion of voice communications between first and second end user devices. An interrogating call session control function of an internet protocol multimedia subsystem can route traffic between different systems operating using the different protocols in order to complete calls. The routing can be based on the success or failure of a mapping query performed by the interrogating call session control function. By routing traffic as described in the exemplary embodiments, a service provider can migrate subscribers on an individual or limited basis to a different service.

One embodiment of the present disclosure includes an interrogating call session control function server of an internet protocol multimedia subsystem, where the server includes at least one memory and at least one controller coupled to the at least one memory. The at least one controller can be operable to receive a request for a voice call associated with an originating communication device (originating end user communication device, originating end user device), and where the interrogating call session control function server is selected from a group of interrogating call session control function servers based on a local routing number for the circuit switching being hosted by a mobile switching center that is coupled to the interrogating call session control function server. The at least one controller can be operable to transmit a mapping query to a database of the internet protocol multimedia subsystem in response to the request for the call. The at least one controller can be operable to, when the mapping query is successful in obtaining an internet protocol address for establishing the call with a recipient communication device, route the request to a serving call session control function of the internet protocol multimedia subsystem for establishing the call. The at least one controller can be operable to, when the mapping query is not successful in obtaining the internet protocol address, route the request to a second server for establishing the call without routing the request to the serving call session control function of the internet protocol multimedia subsystem.

One embodiment of the present disclosure includes a non-transitory computer-readable storage medium can include computer instructions to receive a request for a voice call associated with an originating communication device, where the request is received at a first server of a first network that supports communication sessions between an end user device in a circuit-switched network and an end user device in a packet-switched network. The computer instructions can enable, when a mapping query is determined to be successful in obtaining an internet protocol address for establishing the voice call with a recipient communication device, routing of the request from the first server to a second server of the first network for establishing the voice call via the first network. The computer instructions can enable, when the mapping query is determined not to be successful in obtaining the internet protocol address, routing of the request from the first server to a third server of a second network for establishing the voice call without routing the request to the second server of the first network.

One embodiment of the present disclosure is a method including receiving a request for a voice call at an interrogating call session control function server of an internet protocol multimedia subsystem, where the call is associated with an originating communication end user device. The method can include in response to the request for the call, transmitting a mapping query from the interrogating call session control function server to a database to obtain an internet protocol address for establishing the call with a recipient communication end user device. The method can include routing the request to one of a serving call session control function of the internet protocol multimedia subsystem or a second server based on a response to the mapping query provided by the database. The method can also include monitoring call routing decisions, maintaining statistics related to the monitored call routing decisions, and prioritizing a list of candidate end user devices for migration to the internet protocol multimedia subsystem based on the statistics.

FIG. 1 depicts an illustrative embodiment of a call flow process in a communication system 100. System 100 can include a gateway, such as a Circuit Switch Gateway (CSG) 110 (which can also be called a Mobile Switching Center (MSC) 110), that can include various components, such as a server(s), for processing calls between an originating communication device 101 and one or more recipient or terminating communication devices 102 (which can also be known as a terminating end user communication device, terminating end user device, recipient end user communication device, recipient end user device). The recipient communication devices 102 can be associated with a subscriber of a system(s) operating according to various communication protocols, such as a Long Term Evolution (LTE) network, Evolved Universal Terrestrial Radio Access Network (E-UTRAN), Universal Terrestrial Radio Access Network (UTRAN), and circuit-switched technologies such as circuit switched 2G or 3G Global System for Mobile communications (GSM).

The CSG 110 can provide access to and/or from a Public Switched Telephone Network (PSTN), wireless Mobile Switching Centers (MSCs), and Enterprise Time Division Multiplexing (TDM) endpoints such as TDM Private Branch Exchanges (PBXs), which can be high-capacity telephone trunk connections. In one embodiment, the CSG 110 can be in communication with, or integrated with, a MSC which is operable to perform various functions, including selectively being a primary service delivery node for various communication formats, such as voice calls, Short Message Service (SMS) and/or facsimile services. In one embodiment, the CSG 110 and/or the MSC can selectively perform setting-up and releasing of end-to-end connections (e.g., depending on the type of recipient communication device, the originating network and/or the service plan associated with the device), mobility and hand-over requirements during a call, and/or real-time pre-paid account monitoring. In one embodiment, the CSG 110 and/or the MSC can selectively perform the function of a gateway mobile switching center and can determine or otherwise identify a Visited Mobile Switching Center (vMSC) 111 associated with the recipient communication device 102, such as based on location of the device 102. The CSG 110 and/or the MSG can selectively perform other functions, including generating billing information, delivering SMS messages to an SMS center, arranging handovers between base station controllers and/or other MSC's, and/or supporting other services, such as conference calls and call holding.

In one embodiment, the CSG 110 can interface with the originating network and/or can be selected from among a group of CSG's, such as based on hosting a Local Routing Number (LRN) associated with a circuit switch of the originating network of the communication device 101 as indicated by arrow 1. In one embodiment, the CSG 110 can be selected from the group of CSG's based on a Local Number Portability (LNP) dip to obtain the LRN associated with the recipient communication device 102, and the originating switch can then route a call request to the CSG 110 hosting the LRN. The call can be a voice call.

In response to the call request originating from the communication device 101, the CSG 110 can route the call request to an Internet Protocol Multimedia Subsystem (IMS) network 130. In one embodiment, the call request can be routed from the CSG 110 to an Interrogating Call Session Control Function (I-CSCF) 140 of the IMS network 130 as indicated by arrow 2. In one embodiment, the I-CSCF 140 can be selected from among a group of I-CSCFs of the IMS network 130 based on the LRN associated with the circuit switch of the terminating network of the communication device 102. An IMS network can include components and perform functions that enable an end user device operating in a circuit-switched network to communicate with another end user device operating in a packet-switched network. An IMS network can be a network that supports both circuit-switched protocols and packet-switched protocols for establishing communication sessions.

In response to receiving the call request, the I-CSCF 140 can perform a telephone Number Mapping (ENUM) query to an ENUM database 120 based on the telephone number of the recipient communication device 102 as indicated by arrow 3.

If the ENUM database 120 provides a positive response (e.g., there is a successful Session Initiation Protocol (SIP) address resolution), then a SIP Uniform Resource Identifier (URI) can be obtained, which enables a Domain Name System (DNS) query (not shown) to obtain a corresponding Internet Protocol address. The DNS query can also be performed by the I-CSCF 140. The I-CSCF 140 can then route the request to a server 150*a-s* of the IMS network 130 for further call processing as indicated by arrow 4*b*. It should be understood that the request can be of various forms, such as a SIP INVITE message or derivative thereof. The ENUM database 120 can be a database associated with the IMS network 130 as shown in FIG. 1 or can be independent of the IMS or an LTE network 130. The ENUM database 120 can be configured to receive and respond to ENUM queries from various sources, such as the CSG or MSC 110, as well as other components, such as a Serving Call Session Control Function (S-CSCF). In one embodiment, the server 150*a-s*, which can receive the SIP INVITE from the I-CSCF 140, can be a server that implements a Serving Call Session Control Function (S-CSCF).

System 100 can include and/or interface with other components and perform other functions. For example, the network (e.g., an IMS network or LTE network) 130 can include one or more other servers and other components (not shown), which may include services for, but are not limited to, for example, one or more instances of a Home Subscriber Server (HSS); a Proxy Call Session Control Function (P-CSCF); a S-CSCF; a Domain Naming Server; a Session Border Controller (SBC); a Breakout Gateway Control Function (BGCF); an application server; wired and/or wireless interface services (not shown, but can be coupled with and/or included in the example network 130) such as, for example, Evolved Universal Terrestrial Radio Access (EU-TRA), one or more forms of packet core functions (such as an Evolved Packet Core (EPC), radio network such as Evolved Universal Terrestrial Radio Access Network (EU-TRAN), wireless towers.

Where the response to the ENUM query performed by the I-CSCF 140 is negative (e.g., there is not a successful SIP address resolution), the I-CSCF 140 can then route the request to a second server(s) 190*a-t* as indicated by arrow 4*a*. The second server 190*a-t* can further process the request, such as acting as a mobility gateway and providing the call request to the vMSC 111 for completion of the call with the recipient communication device 102, which can be operating on a circuit switched network, such as a circuit switched GSM network. The second server 190*a-t* can be various computing devices, including a general purpose computing device, and can be located at various places, including a central office of the service provider. In one embodiment, the second server 190*a-t* can implement various capabilities such as call forwarding, call waiting, and last call return Various functions of the second server 190*a-t* may be implemented using one or more servers, such as through a distributed configuration.

It should be further understood that while the exemplary embodiments describe recipient communication devices that can be LTE compatible and circuit-switched GSM compatible, the present disclosure also contemplates the recipient devices operating in other types of systems that are based on other communication protocols. The exemplary embodiments can include the I-CSCF 140 of FIG. 1 performing an ENUM query to determine whether the request should be diverted to a circuit switched network or whether the IMS network should continue processing the call request. The exemplary embodiments can divert calls among various systems, including various circuit-switched and packet-switched networks, including Code Division Multiple Access (CDMA) networks, Time Division Multiple Access (TDMA) networks, World interoperability for Microwave (WiMAX) networks, and/or Software Defined Radio (SDR) networks.

Other present and next generation wide area wireless network technologies are contemplated by the present disclosure.

In one embodiment, system 100 can perform call flow processing and routing at the I-CSCF 140 based on the ENUM query so that the IMS network 130 does not need to rely on a Breakout Gateway Control Function (BGCF) (not shown) which is a SIP proxy that can processes requests for routing from an S-CSCF when the S-CSCF has determined that the session cannot be routed using DNS or ENUM/DNS. Various components or portions of system 100 can perform other call processing functions and can establish calls, including voice, video and/or messaging, using other techniques, in addition to the I-CSCF 140 performing the ENUM query and routing traffic based on the response to the ENUM query. For instance, if an originating communication device is not operating in a circuit-switched network, then the device may be able to connect with the IMS network 130. A more detailed description of various other functions and/or components of the IMS network 130 can be found in U.S. Patent Application Publication Nos. 20090191871 and 20080285543, the disclosures of which are hereby incorporated by reference. The IMS network 130 supports the combined services of circuit-switched and packet-switched systems. Thus, in one embodiment, an end user device operating in a circuit-switched network and an end user operating in a packet-switched network can establish or otherwise engage in a communication session with each other via the IMS network 130.

The IMS network 130 of FIG. 1 may also be communicatively coupled to one or more servers (e.g., servers 150*a-s*), which may implement Session Border Controller (SBC) functions. In one embodiment, each SBC can dynamically maintain the last updated IP addresses associated with other SBC's of the system 100 by obtaining the last updated IP addresses in the call requests or the responses to the call requests as calls are being processed by the SBC's. Methods and systems for dynamically updating IP addresses are described in U.S. application Ser. No. 13/112,234 to Ku et al. filed on May 20, 2011, the disclosure of which is hereby incorporated by reference. System 100 can also provide for a determination of an undesired condition associated with one or more of the networks shown in FIG. 1, such as a call processing failure at a network element which could otherwise prevent completion of a voice call. In one embodiment, the I-CSCF 140 can detect the undesired condition. In one embodiment, time stamps and other indicia can be used with an IP addresses that may have been previously saved by the I-CSCF 140 for the end user devices to facilitate a determination of the last updated IP address information.

In one embodiment, the I-CSCF 140 can store IP addresses as they are processed from the ENUM and DNS queries. The stored IP addresses can be utilized as described above as the last updated IP address in the event of a call processing error.

In some instances the aforementioned communication process between communication devices is symmetrical. Accordingly, the terms "originating", "recipient" and "terminating" in FIG. 1 may be interchangeable.

Figure 2:
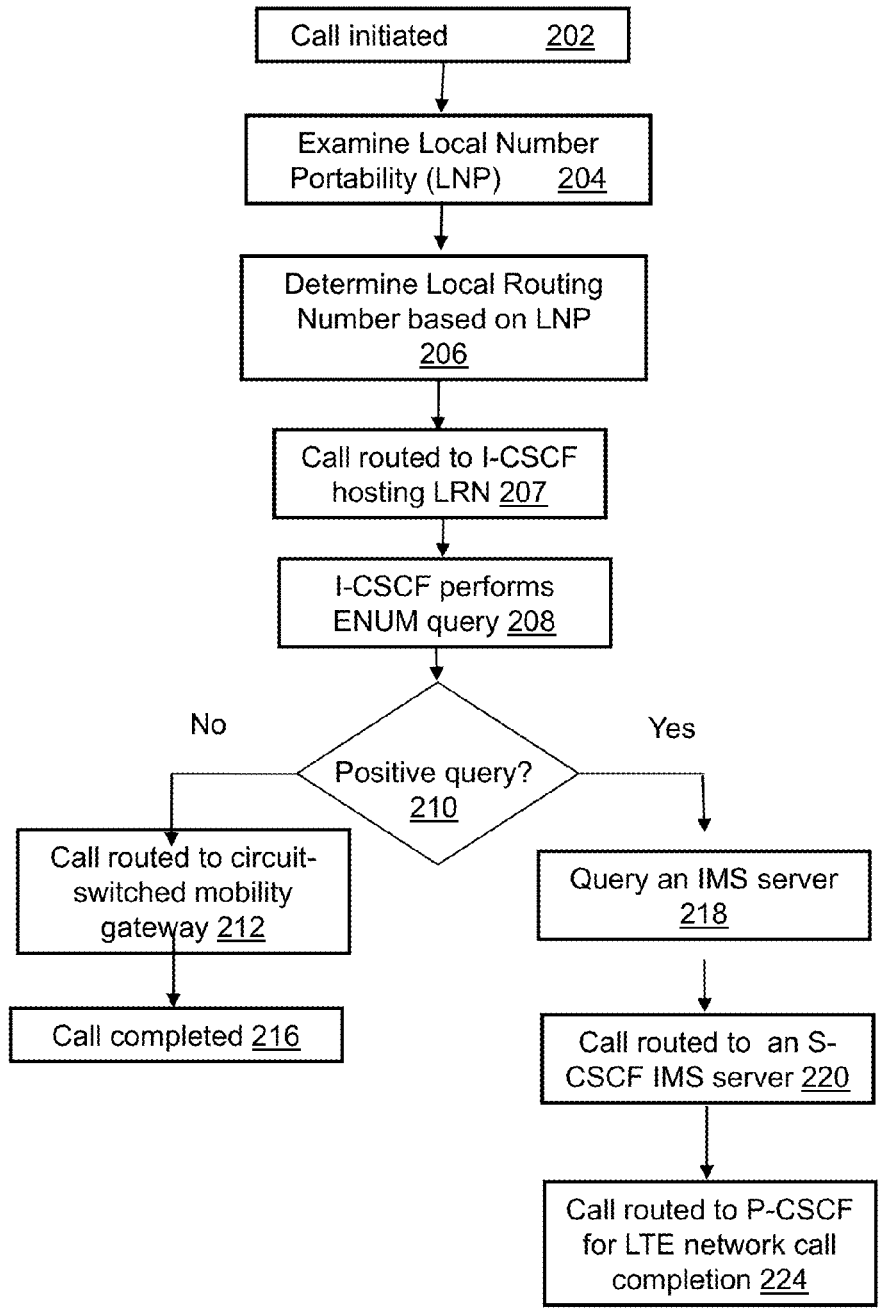
FIG. 2 depicts an illustrative embodiment of a method operating in portions of the system of FIG. 1.

FIG. 2 depicts an illustrative method 200 that can operate in conjunction with the call flow processing and the system of FIG. 1. At 202, a voice call can be initiated by an originating communication device (e.g., device 101 of FIG. 1) from an originating network. The call can be from various types of originating networks, such as a network utilizing circuit-switching techniques and components, including an originating switch.

To route the call request to the recipient communication device (e.g., device 102 of FIG. 1), an LNP dip or examination of an LNP database can be performed at 204. The LNP dip can be performed by various devices using various techniques, including the LNP dip being performed by a server of the originating network. At 206, the LRN can be determined based on the results of the LNP dip. In one embodiment, a CSG can be selected from a group of CSG's based on the LRN, where the selected CSG is hosting the LRN.

At 207, the call request can be routed from the CSG into the IMS network to an I-CSCF (e.g., I-CSCF 140 of FIG. 1) for further call processing. The I-CSCF can be selected based on hosting the LRN. Method 200 can be utilized to route call requests between IMS-based systems and non-IMS based systems. In one embodiment, the criteria for routing can be based on the subscriber's service plan and/or the compatibility of the communication device(s) involved in the call. In one embodiment at 208, the I-CSCF of the IMS network can perform an ENUM query of an ENUM database based on the call request, such as based on the telephone number of the recipient communication device 102. By utilizing the ENUM query, method 200 can provide up-to-date subscriber information, such as whether the subscriber has switched to a different service (e.g., switching from a GSM service to an LTE service). The use of the ENUM query from the ENUM database 120 as a determinative factor for routing of the call requests can reduce cost and use of resources for the service provider since the ENUM query is already being maintained and this can eliminate the need for another database of information to consult to determine whether a call request should be routed to a second server 190*a-t* or should continue through the IMS network 130. The ENUM query can result in receiving a SIP URI and the I-CSCF requesting a corresponding IP address from a DNS server.

In one embodiment, when an end user device 102, which is capable of operating in both a circuit-switched environment and a packet environment such as an IMS network or an LTE network, is to be migrated over to an IMS network from a circuit-switched network (e.g., for better service), mapping information for that end user device 102 can be configured (provisioned) into the ENUM server 102 and the LRN of that end user device 102 can also be migrated to the IMS network 130. If the LRN of the device is migrated, but the mapping information is not configured into the ENUM server 120, then the IMS network 130 may not successfully complete the call from the end user device 101 on the IMS network.

The exemplary embodiments also contemplate other techniques being utilized for determining where the call request should be routed (e.g., routed through the IMS network 130 or routed to a second server 190*a-t*). For instance in one embodiment, the I-CSCF 140 can store results of ENUM queries for recipient devices and can selectively base routing decisions on the stored results without performing an ENUM query. Time thresholds can be applied to the use of the stored ENUM query results to reduce the likelihood that the subscriber of the recipient device has migrated to a different service subsequent to the last ENUM query result. In this example, if the time threshold has not been met (e.g., the last ENUM query occurred too long ago for the particular recipient device) then the I-CSCF 140 can perform the ENUM query. Other call request filtering schemes can also be employed, including distinguishing between call requests from circuit-switched originating networks and packet-switched originating networks and distinguishing between types of calls such as voice, messaging and video calls.

At 210, a determination can be made by the I-CSCF 140 as to whether there was a positive result from the ENUM query (e.g., an IP address resolution was successful). If the ENUM query was negative (e.g., the IP address resolution was unsuccessful), then at 212 the call request can be routed by the I-CSCF 140 to a circuit-switched mobility gateway (e.g., CSG 110). The call can be completed to the end user device 102 at step 216.

One or more of the example embodiments can include one or more of the servers 150a-s performing various functions or operating as various components of the IMS network 130, including operating as an HSS server, an application server, an S-CSCF server and/or a P-CSCF server. In this example, the servers 150a-s can combine IMS functionality and/or can be dedicated devices.

If on the other hand, at step 210, the ENUM query were positive (e.g., the IP address resolution was successful), then the method proceeds to step 218. In one embodiment, in step 218, the I-CSCF 140 can transmit a query to an HSS server 150a-s of the IMS network to obtain identification data for an S-CSCF server 150a-s selected from among a group of available S-CSCFs servers 150a-s. Based on receipt of this data, the I-CSCF can route the call request at 220 to the selected S-CSCF server 150a-s of the IMS network 130. In step 224, the selected S-CSCF can forward the call request for call completion (e.g., by forwarding it to a P-CSCF server 150a-s for sending to the end user device 102).

In one embodiment, the P-CSCF can be combined with other devices and/or functionality of the IMS network 130, such as a Session Border Controller (SBC), Access Transfer Gateway (ATG), and/or Access Transfer Control Function (ATCF). The P-CSCF can perform various other functions, including subscriber authentication, security association (e.g., IPsec or TLS), signal inspection, message compression and decompression, policy enforcement (e.g., network routing policy or bandwidth management), and/or generating charging records.

In one embodiment, a determination can be made (such as by the selected S-CSCF server 150a-s or another component of the IMS network 130) as to whether the user of the recipient device 102 is a subscriber of the LTE network. If the call can be, or is otherwise authorized to be, completed via the LTE network then the S-CSCF can route the call via a P-CSCF of the LTE network for call completion at 224.

Method 200 can be utilized by a service provider for migration of subscribers on an individual or limited basis between services. In one embodiment, data gathered from operation of the routing decision (e.g., routing to a second server 150a-s versus routing to the IMS network 130) can be utilized to determine subscribers that are to be migrated to a different service, such as migration from GSM to LTE service. The data can be gathered by various components, including the I-CSCF 140 and/or a server 150a-s upon making a routing determination. As an example, based on monitoring call routing being performed by the I-CSCF, communication devices that are more often utilizing a second server 150a-s for call completion may be migrated to the LTE service before other communication devices that less often utilize the second server 150a-s. In one embodiment, an I-CSCF 140 can monitor routing decisions, collect routing statistics about traffic routing, can prepare a prioritized list of end user devices, and can report (for example, using an administrative interface) such a prioritized lists, which can be used for prioritized migrations of end user devices. In one embodiment, an interface of the I-CSCF 140 can provide a prioritized list of candidate end user devices 102 to a recipient device or system for performing, confirming or otherwise processing the migration of at least a portion of the candidates on the list. The exemplary embodiments can include other devices that monitor the decisions, generate statistics and/or generate the prioritized list. Various techniques can be utilized in generating the statistics based on various factors, such as an end user's frequency of use, cost of migration, cost of non-migration, geographic region and so forth.

Figure 3:
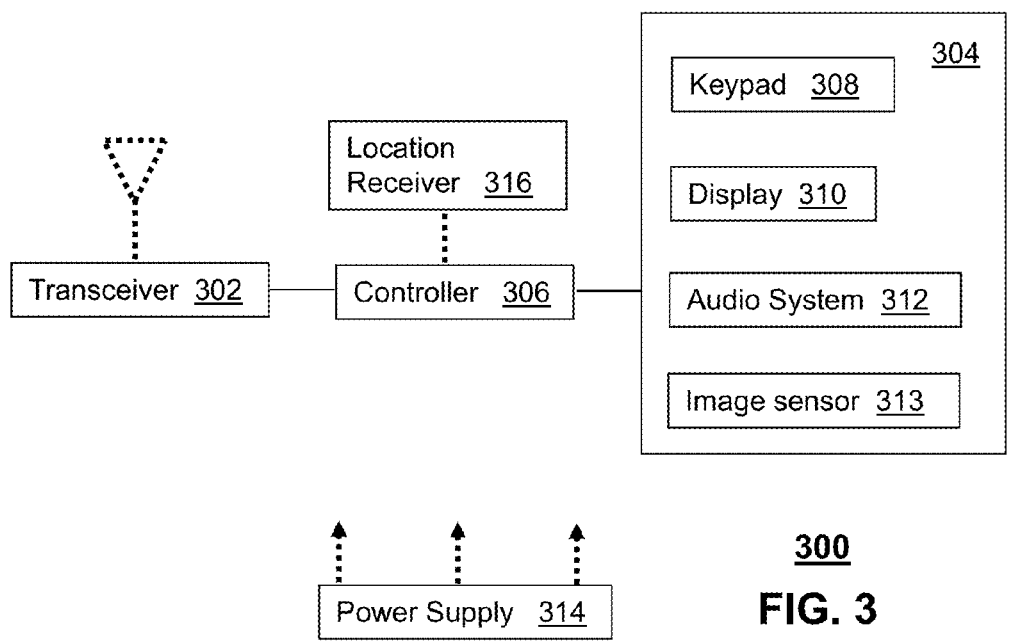
FIG. 3 depicts an illustrative embodiment of a communication device utilized in the communication system of FIG. 1.

FIG. 3 depicts an exemplary embodiment of a communication device 300. Communication device 300 can serve in whole or in part as an illustrative embodiment of user endpoint devices depicted in FIG. 1. The communication device 300 can function as a caller or callee's end user device that can participate in a completed voice call and/or messaging session despite the compatibility of the devices and/or the compatibility of the networks in which the devices are operating. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), and/or other cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation cellular wireless communication technologies as they arise. The transceiver 302 can also be adapted to support circuit-switched wireline access technologies (such as PSTN), packet-switched wireline access technologies (such as various forms of IEEE 802.11 networking technologies, TCP/IP, VoIP, etc.), and combinations thereof The UI 304 can include a depressible or touch-sensitive keypad 308 with a navigation mechanism such as a roller ball, a thumbwheel, a joystick, a mouse, or a navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys used by smart phones. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display 310 with navigation features.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver capable of assisted GPS for identifying a location of the communication device 300 based on signals generated by a constellation of GPS satellites, thereby facilitating common location services such as navigation.

The communication device 300 can use the transceiver 302 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the communication or user end point devices of FIG. 1. It will be appreciated that the communication device 300 can also represent other common devices that can operate in communication system 100 of FIG. 1.

Upon reviewing the aforementioned embodiments, it would be evident to an artisan with ordinary skill in the art that said embodiments can be modified, reduced, or enhanced without departing from the scope and spirit of the claims described below.

Figure 4:
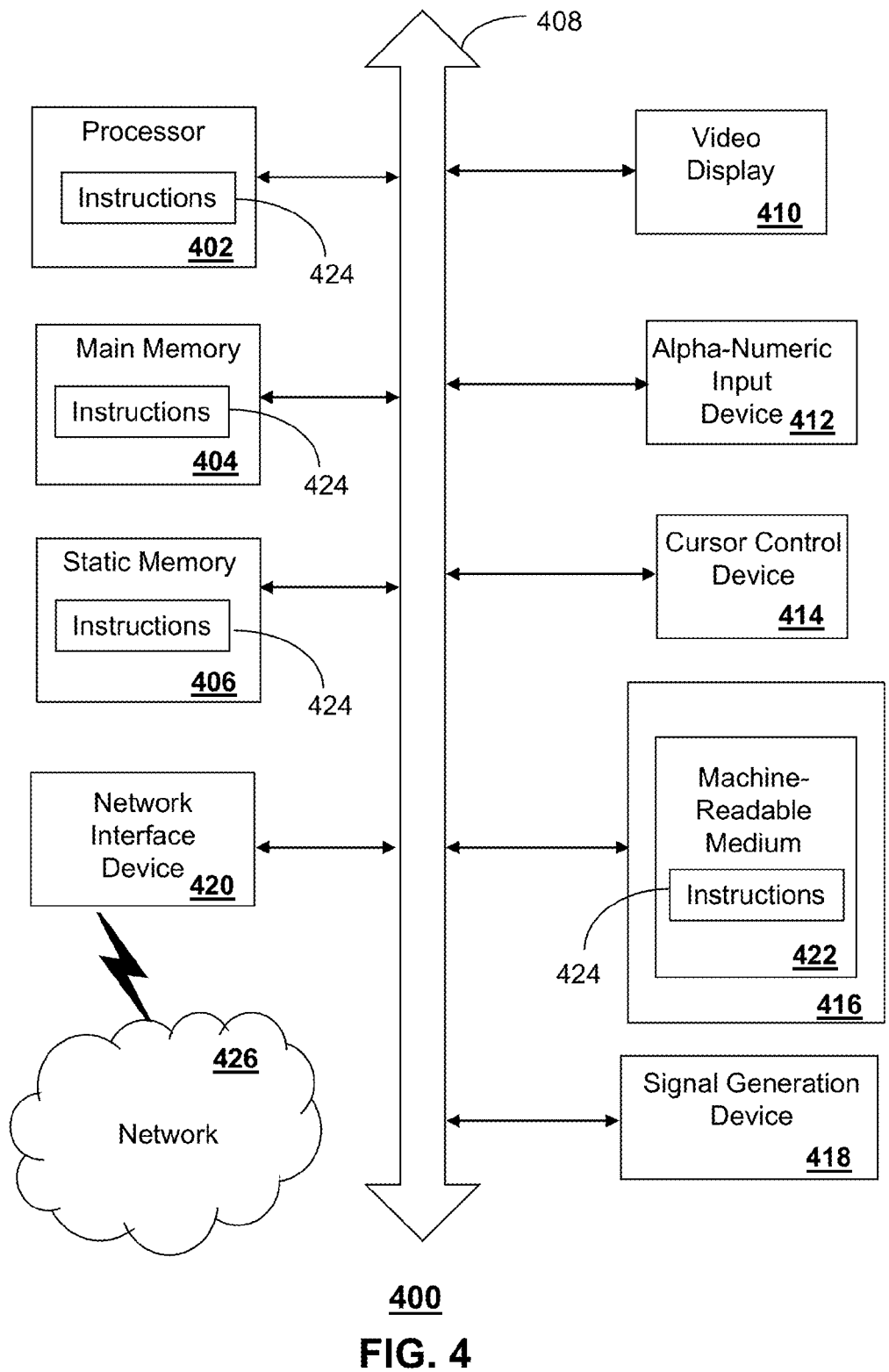
FIG. 4 is a diagrammatic representation of a machine in the form of a computer system within which a set of instructions, when executed, may cause the machine to perform any one or more of the methods disclosed herein.

FIG. 4 depicts an exemplary diagrammatic representation of a machine in the form of a computer system 400 within which (e.g., stored on a non-transitory storage medium) a set of instructions, when executed, may cause the machine to perform any one or more of the methods discussed above. One or more instances of the machine can operate, for example, as the devices of FIG. 1, including the I-CSCF 140 to perform ENUM queries and/or divert call flow traffic based on the ENUM query. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, or a solid state display. The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a tangible computer-readable storage medium 422 on which is stored one or more sets of instructions (e.g., software 424) embodying any one or more of the methods or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., LTE, WiMAX, GSM, CDMA) are contemplated for use by computer system 400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. One or more of the method steps described herein can be removed, performed in another sequence, and/or performed individually or simultaneously. Other method steps can also be added to the techniques described herein. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An interrogating call session control function server operating in an internet protocol multimedia subsystem core of an internet protocol multimedia subsystem, the server comprising:
    a memory to store computer instructions; and
    a controller coupled to the memory, wherein the controller, responsive to executing the computer instructions, performs operations comprising:
        receiving a request for a voice call associated with an originating communication device operating in a first network;
        routing the request to a first server of the internet protocol multimedia subsystem for facilitating establishment of the voice call when an internet protocol address is determined to be available for establishing the voice call with a recipient communication device; and
        routing the request to a second server of a second network for facilitating establishment of the voice call without routing the request to another server of the internet protocol multimedia subsystem when the internet protocol address is determined not to be available for establishing the voice call with the recipient communication device,
    wherein the interrogating call session control function server is selected from a group of interrogating call session control function servers based on a local routing number being hosted by the interrogating call session control function server,
    wherein call routing decisions associated with the internet protocol multimedia subsystem and the second network are monitored, and
    wherein a list of candidate end user devices is generated for migration to the internet protocol multimedia subsystem.

2. The interrogating call session control function server of claim 1, wherein the operations further comprise providing a mapping query to a database of the internet protocol multimedia subsystem for determining whether the internet protocol address is available for establishing the voice call with the recipient communication device, wherein the mapping query is provided in response to the request for the voice call.

3. The interrogating call session control function server of claim 2, wherein the request is received by the controller from a circuit switch gateway via circuit switching, wherein the voice call is established using circuit switching via the second network when the mapping query is not successful in obtaining the internet protocol address, and wherein the circuit switch gateway is selected based on local number portability database dip associated with the voice call.

4. The interrogating call session control function server of claim 2, wherein when the mapping query is successful in obtaining the internet protocol address, a serving call session control function server and a proxy call session control function server of the internet protocol multimedia subsystem participate in completing the voice call with the recipient communication device operating in a long term evolution network.

5. The interrogating call session control function server of claim 2, wherein the mapping query comprises a telephone number mapping query and a domain name system query base on a session initiation protocol uniform resource identifier.

6. The interrogating call session control function server of claim 2, wherein when the mapping query is not successful in obtaining the internet protocol address, the operations further comprise:
    transmitting a second query to a home subscriber server of the internet protocol multimedia subsystem;
    receiving data in response to the second query from the home subscriber server; and
    identifying a serving call session control function based on the data.

7. The interrogating call session control function server of claim 1, wherein the second server routes the request to a visited mobile switching center for completing the voice call with the recipient communication device operating in a global system for mobile communications network when the internet protocol address is determined not to be available for establishing the voice call with the recipient communication device, wherein the visited mobile switching center corresponds to a location of the recipient communication device.

8. A computer-readable storage device comprising computer instructions which, responsive to being executed by a processor, perform operations comprising:
    receiving a request for a voice call associated with an originating communication device, wherein the request is received at a first server of a first network that supports communication sessions between an end user device in a circuit-switched network and an end user device in a packet-switched network;
    when a mapping query is determined to be successful in obtaining an internet protocol address for establishing the voice call with a recipient communication device, route the request from the first server to a second server of the first network for facilitating establishment of the voice call via the first network; and when the mapping query is determined not to be successful in obtaining the internet protocol address, route the request from the first server to a third server of a second network for facilitating establishment of the voice call without routing the request to the second server of the first network, wherein the first network includes an internet protocol multimedia subsystem, wherein call routing decisions associated with the first and second networks are monitored, and wherein a list of candidate end user devices is generated for migration to the internet protocol multimedia subsystem.

9. The computer-readable storage device of claim 8, wherein the second network does not support communication sessions between an end user device in a circuit-switched network and an end user device in a packet-switched network, wherein the first server comprises an interrogating call session control function, wherein the first network comprises an internet protocol multimedia subsystem, and wherein the operations further comprise:

transmitting the mapping query from the interrogating call session control function to a database of the internet protocol multimedia subsystem in response to the request for the voice call, wherein the request is received at the interrogating call session control function via a circuit switch gateway utilizing circuit switching, and wherein the circuit switch gateway is selected from a group of circuit switch gateways based on a local number portability database dip associated with the voice call.

10. The computer-readable storage device of claim 9, wherein when the mapping query is determined not to be successful in obtaining the internet protocol address, a serving call session control function server and a proxy call session control function of the internet protocol multimedia subsystem participate in completing the voice call with the recipient communication device operating in a long term evolution network.

11. The computer-readable storage device of claim 8, wherein the operations further comprise routing the request utilizing a mobility gateway when the mapping query is determined not to be successful in obtaining the internet protocol address.

12. The computer-readable storage device of claim 8, wherein the mapping query comprises a telephone number mapping query and a domain name system query.

13. The computer-readable storage device of claim 8, wherein the third server routes the request to a visited mobile switching center for completing the voice call with the recipient communication device operating in a global system for mobile communications network when the mapping query is determined not to be successful in obtaining the internet protocol address.

14. The computer-readable storage device of claim 13, wherein the visited mobile switching center corresponds to a location of the recipient communication device.

15. A method comprising:

receiving a request for a voice call at an interrogating call session control function server of an internet protocol multimedia subsystem, the voice call being associated with an originating communication device operating in a first network, in response to the request for the voice call, providing a mapping query from the interrogating call session control function server to a database to obtain an internet protocol address for establishing the voice call with a recipient communication device;

routing the request to a first server of the internet protocol multimedia subsystem or to a second server of a second network based on a response to the mapping query provided by the database;

monitoring call routing decisions associated with the internet protocol multimedia subsystem and the second network;

maintaining statistics related to the monitored call routing decisions; and prioritizing a list of candidate end user devices for migration to the internet protocol multimedia subsystem based on the statistics.

16. The method of claim 15, comprising migrating at least a portion of the candidate end user devices from the prioritized list to the internet protocol multimedia subsystem.

17. The method of claim 15, comprising providing the prioritized list over an interface of the interrogating call session control function server of the internet protocol multimedia subsystem.

18. The method of claim 15, comprising routing the request to the second server without routing the request to another server of the internet protocol multimedia subsystem for facilitating establishment of the voice call when the query is not successful in obtaining the internet protocol address.

19. The method of claim 15, comprising routing the request from the first server to another server of the internet protocol multimedia subsystem for facilitating establishment of the voice call when the query is successful in obtaining the internet protocol address, wherein the first server is an interrogating call session control function server.

* * * * *